US012741389B2

(12) United States Patent
Pan et al.

(10) Patent No.: US 12,741,389 B2
(45) Date of Patent: Sep. 22, 2026

(54) MULTI-FUNCTIONAL KNIFE

(71) Applicant: NINGBO XINGWEI CUTTING-TOOLS TECHNOLOGY CO., LTD., Ningbo (CN)

(72) Inventors: Mingxiang Pan, Ningbo (CN); Yuancheng Ye, Ningbo (CN)

(73) Assignee: NINGBO XINGWEI CUTTING—TOOLS TECHNOLOGY CO., LTD., Ningbo (CN)

( * ) Notice: Subject to any disclaimer, the term of this patent is extended or adjusted under 35 U.S.C. 154(b) by 0 days.

(21) Appl. No.: 18/878,662

(22) PCT Filed: Feb. 5, 2024

(86) PCT No.: PCT/CN2024/075931

§ 371 (c)(1),
(2) Date: Dec. 24, 2024

(87) PCT Pub. No.: WO2025/129805

PCT Pub. Date: Jun. 26, 2025

(65) Prior Publication Data

US 2026/0001244 A1 Jan. 1, 2026

(30) Foreign Application Priority Data

Dec. 22, 2023 (CN) ........................ 202311787417.2
Jan. 22, 2024 (CN) ........................ 202410089192.1
Jan. 22, 2024 (CN) ........................ 202410092612.1

(51) Int. Cl.
*B26B 11/00* (2006.01)
*B26B 1/02* (2006.01)
(Continued)

(52) U.S. Cl.
CPC .............. *B26B 11/006* (2013.01); *B26B 1/02* (2013.01); *B26B 1/08* (2013.01); *B26B 5/003* (2013.01)

(58) Field of Classification Search
CPC .. B26B 1/02; B26B 1/08; B26B 5/003; B26B 5/005; B26B 5/006; B26B 11/006
(Continued)

(56) References Cited

U.S. PATENT DOCUMENTS 1,079,300 A * 11/1913 Littleton, Jr. et al. . A41H 25/02 30/154
2,071,562 A * 2/1937 Nelson .................. B44D 3/162 30/154
(Continued)

FOREIGN PATENT DOCUMENTS

CN 112207860 A 1/2021
CN 217097875 U * 8/2022 ............... B26B 1/02
(Continued)

*Primary Examiner* — Jason Daniel Prone
(74) *Attorney, Agent, or Firm* — Cooper Legal Group, LLC

(57) ABSTRACT

A multi-functional knife is provided, including: a housing provided with an accommodating cavity and an opening, where the opening is provided at a first end of the housing; a blade holder configured to hold a blade and removably accommodated in the accommodating cavity; a first guide assembly including a first guide rail and a drive member which is drivably connected to a first side of the blade holder to cause the blade holder to move along the first guide rail; and a second guide assembly including a fixed surface and a second guide rail provided on the fixed surface. A second side of the blade holder is pivotally connected to the second guide rail to cause the blade holder to move along the second guide rail.

11 Claims, 18 Drawing Sheets

(51) Int. Cl.
*B26B 1/08* (2006.01)
*B26B 5/00* (2006.01)

(58) Field of Classification Search
USPC .............. 30/2, 153–155, 162, 169, 320, 321
See application file for complete search history.

(56) References Cited

U.S. PATENT DOCUMENTS

| | | | | | |
|---|---|---|---|---|---|
| 2,094,260 | A | * | 9/1937 | Brody | B26B 5/006 30/162 |
| 2,107,736 | A | * | 2/1938 | Huber | B26B 5/006 30/162 |
| 2,133,087 | A | * | 10/1938 | Ericsson | B44D 3/162 30/321 |
| 2,164,050 | A | * | 6/1939 | Brown | B26B 5/006 30/321 |
| 2,242,900 | A | * | 5/1941 | Bender | B26B 5/006 30/154 |
| 2,257,314 | A | * | 9/1941 | Shinn, Jr. | B44D 3/162 30/320 |
| 2,650,422 | A | * | 9/1953 | Soltow et al. | B26B 5/00 30/154 |
| 2,870,537 | A | * | 1/1959 | Ortner | B26B 5/001 30/162 |
| 3,176,395 | A | * | 4/1965 | Warner et al. | B26B 1/02 30/154 |
| 3,518,758 | A | * | 7/1970 | Bennett | B26B 5/005 30/154 |
| 3,667,122 | A | * | 6/1972 | Black | B26B 29/02 30/335 |
| 4,100,677 | A | * | 7/1978 | Jeff | B26B 5/00 30/321 |
| 4,617,736 | A | * | 10/1986 | McCrary | B26B 5/006 30/169 |
| 6,000,137 | A | * | 12/1999 | Gamba | B26B 1/08 30/169 |
| 7,797,835 | B2 | * | 9/2010 | Zeng | B26B 1/02 30/162 |
| 8,353,109 | B2 | * | 1/2013 | Rohrbach | B26B 5/003 30/162 |
| 8,689,450 | B2 | * | 4/2014 | Constantine | B26B 1/08 30/162 |
| 8,707,566 | B2 | * | 4/2014 | Rohrbach | B26B 5/003 30/162 |
| 8,732,957 | B2 | * | 5/2014 | Rohrbach | B26B 5/003 30/162 |
| 8,739,414 | B2 | * | 6/2014 | Tyers | B26B 11/00 30/162 |
| D750,463 | S | * | 3/2016 | Sonne | D8/107 |
| 10,589,436 | B1 | * | 3/2020 | Panosian | B26B 1/08 |
| 11,446,833 | B2 | * | 9/2022 | Ng | B26B 5/003 |
| 11,752,613 | B2 | * | 9/2023 | Christian | B26B 5/003 30/162 |
| 12,280,511 | B1 | * | 4/2025 | Pan | B26B 5/003 |
| 12,427,681 | B2 | * | 9/2025 | Du | B26B 11/006 |
| D1,098,871 | S | * | 10/2025 | Pan | D8/99 |
| D1,098,872 | S | * | 10/2025 | Pan | D8/99 |
| 2009/0106909 | A1 | | 4/2009 | Tyers | |
| 2022/0362917 | A1 | | 11/2022 | Christian | |
| 2023/0311349 | A1 | * | 10/2023 | Du | B26B 5/003 30/152 |
| 2026/0054398 | A1 | * | 2/2026 | Zhu | B26B 1/08 |

FOREIGN PATENT DOCUMENTS

| | | | | | |
|---|---|---|---|---|---|
| CN | 217620706 | U | * | 10/2022 | B26B 1/08 |
| CN | 218342171 | U | * | 1/2023 | B26B 1/00 |
| CN | 218534633 | U | * | 2/2023 | B26B 1/08 |
| EP | 4574355 | A1 | * | 6/2025 | B26B 5/003 |
| EP | 4588629 | A1 | * | 7/2025 | B26B 1/02 |
| WO | WO-2025129805 | A1 | * | 6/2025 | B26B 1/08 |

* cited by examiner

MULTI-FUNCTIONAL KNIFE

CROSS REFERENCE TO THE RELATED APPLICATIONS

This application is the national phase entry of International Application No. PCT/CN2024/075931, filed on Feb. 5, 2024, which is based upon and claims priority to Chinese Patent Application No. 202311787417.2 filed on Dec. 22, 2023, Chinese Patent Application No. 202410089192.1 filed on Jan. 22, 2024, and Chinese Patent Application No. 202410092612.1 filed on Jan. 22, 2024, the entire contents of which are incorporated herein by reference.

TECHNICAL FIELD

The present disclosure relates to the technical field of knives, and specifically to a multi-functional knife.

BACKGROUND

Knives are mainly divided into cutter knives for lateral cutting and scraper knives for scraping. Cutter knives are tools for arts and handicrafts. Most cutter knives have a pull-out structure, including a plastic handle and a blade. Generally, the cutting edge of the blade is parallel to the axis of the handle or housing, and is mainly used for cutting, for example, paper, cardboard, etc. A scraper knife generally has a blade perpendicular or orthogonal to the axis of the handle, and is used for scraping, for example, paint, glue marks, etc. from a flat surface. Cutter knives and scraper knives are separate manual tools, and usually cannot be used for each other's purposes. A user usually needs to purchase, store, and carry both the two types of separate tools, which is inconvenient to the user.

Existing multi-functional knives can be transformed between a cutter knife and a scraper knife, but have a complicated structure and are inconvenient to operate.

SUMMARY

An objective of the present disclosure is to provide a multi-functional knife, which has a compact structure and can be quickly positioned at multiple angles through the movement of a blade holder on a first guide rail and a second guide rail to serve as a cutter knife or a scraper knife, thereby improving the working efficiency.

Another objective of the present disclosure is to provide a multi-functional knife, which has a simple structure and does not require the use of an additional complicated accessory, and in which a movement trajectory of a blade holder is defined by a first guide rail and a second guide rail on a surface of a housing to allow a blade to be smoothly adjusted to a plurality of positioning positions in a range of 0° to 90°, thereby reducing the production costs.

An objective of the present disclosure is to provide a multi-functional folding knife, which has a compact structure and can be quickly positioned at multiple angles through the movement of a blade holder on a first guide rail and a second guide rail to serve as a cutter knife or a scraper knife, thereby improving the working efficiency.

Another objective of the present disclosure is to provide a multi-functional folding knife, in which a first guide member and a second guide member on a blade holder are deflected and guided to an appropriate direction to generate a thrust force to push the blade holder in a rotational direction, in order to cause the blade holder to rotate to a preset position, so that a blade can be used longitudinally, transversely, or obliquely for different purposes, thereby expanding the application range of the knife.

Another objective of the present disclosure is to provide a multi-functional folding knife, in which a safety assembly is used to retain a blade holder in a longitudinal position to prevent the blade holder from accidentally rotating to cause an accidental injury.

Another objective of the present disclosure is to provide a multi-functional folding knife, in which a self-locking assembly is configured such that an inner housing can be rotated and folded to an outer housing when a blade holder is located in a longitudinal position, and the multi-functional folding knife can be kept in an unfolded state when the blade holder is located in other positions, in order to avoid an accidental injury caused by a blade edge being unable to be smoothly accommodated in a main accommodating chamber.

To achieve the above objectives, the following technical solutions are adopted in the present disclosure. A multi-functional knife is provided, including: a housing, where the housing is provided with an accommodating cavity and an opening, and the opening is provided at a first end of the housing; a blade holder, where the blade holder is configured to hold a blade, and is rotatably mounted in the accommodating cavity; a first guide assembly, where the first guide assembly includes a first guide rail and a drive member, and the drive member is drivably connected to a first side of the blade holder to cause the blade holder to move along the first guide rail; and a second guide assembly, where the second guide assembly includes a fixed surface and a second guide rail provided on the fixed surface, and a second side of the blade holder is pivotally connected to the second guide rail to cause the blade holder to move along the second guide rail, and when the drive member is longitudinally moved along an axial direction relative to the fixed surface, the blade holder is selectively rotated into or out of the accommodating cavity, so that an orientation of the blade holder is changed to a plurality of positioning angles between a longitudinal position and a transverse position alternately.

To achieve the above objectives, the following technical solutions are adopted in the present disclosure. A multi-functional folding knife is provided, including: a housing, where the housing includes an outer housing and an inner housing, the inner housing is rotatably and foldably mounted in the outer housing, and the inner housing is provided with an accommodating cavity and an end opening, and the end opening is provided at a first end of the inner housing; a blade holder, where the blade holder is configured to hold a blade, and is rotatably mounted in the accommodating cavity; a first guide assembly, where the first guide assembly includes a first guide rail and a drive member, and the drive member is drivably connected to a first side of the blade holder to cause the blade holder to move along the first guide rail; and a second guide assembly, where the second guide assembly includes a fixed surface and a second guide rail provided on the fixed surface, and a second side of the blade holder is pivotally connected to the second guide rail to cause the blade holder to move along the second guide rail, and when the drive member translates and/or rotates relative to the fixed surface, the blade holder is selectively rotated into or out of the accommodating cavity, so that an orientation of the blade holder is changed to a plurality of positioning angles between a longitudinal position and a transverse position alternately.

DETAILED DESCRIPTION OF THE EMBODIMENTS

Figure 1:
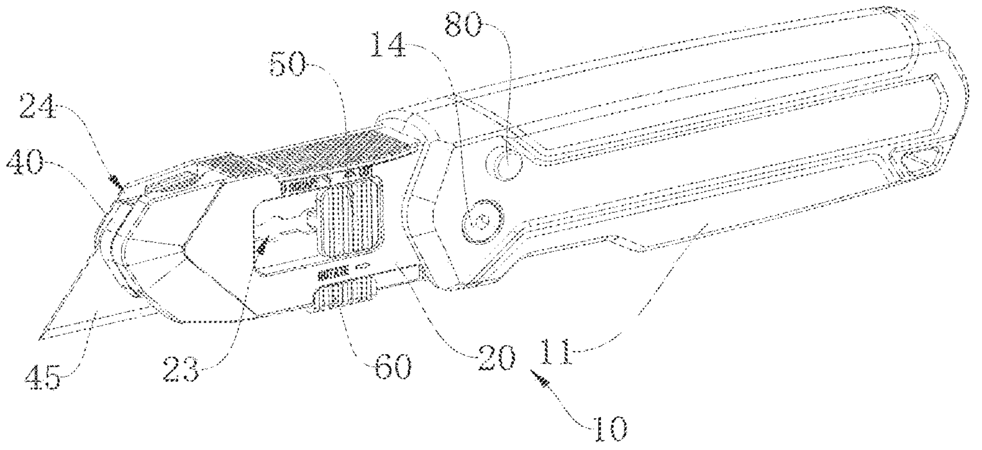
FIG. 1 is a schematic structural diagram of a multi-functional folding knife in an unfolded longitudinal position according to some embodiments of the present disclosure.

The present disclosure will be further described through specific embodiments. It should be noted that the embodiments or technical features described below may be arbitrarily combined to form new embodiments without conflict.

In the description of the present disclosure, it should be noted that orientation and position relationships indicated by the orientation terms such as "center", "transverse", "longitudinal", "length", "width", "thickness", "on", "below", "front", "rear", "left", "right", "vertical", "horizontal", "top", "bottom", "inner", and "outer" are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure.

It should be noted that in the specification and claims of the present disclosure, the terms "first", "second" or the like are intended to distinguish between similar objects but do not indicate a particular order or sequence.

It should be noted that the terms such as "front side" and "rear side" for indicating the orientation are only for the convenience of describing the present disclosure and simplifying the description, rather than indicating or implying that the apparatus or element described must have a specific orientation or be constructed and operated in a specific orientation, may also be expressed as phrases such as "upper side", "lower side", "one side", and "another side", and therefore are not to be construed as limiting the present disclosure.

A multi-functional folding knife is provided. As shown in FIG. 1 to FIG. 7, the multi-functional folding knife includes a housing 10, a blade holder 40, a first guide assembly, and a second guide assembly. The housing 10 includes an outer housing 11 and an inner housing 20. The outer housing 11 is provided with a main accommodating chamber 12 and an opening 13. The opening 13 is provided on a side surface of the outer housing 11 to communicate the main accommodating chamber 12 with outside. The inner housing 20 is rotatably and foldably mounted in the main accommodating chamber 12 by a main shaft 14, and can be rotated out of or into the main accommodating chamber 12 through the opening 13. The inner housing 20 is provided with an accommodating cavity 23 and an end opening 24. The end opening 24 is provided at a first end of the inner housing 20 to communicate the accommodating cavity 23 with outside. The blade holder 40 is configured to hold a blade 45. The blade holder 40 is rotatably mounted in the accommodating cavity 23 and is configured to rotate out of or into the accommodating cavity 23 through the end opening 24. The inner housing 20 is further provided with an avoidance area 231. The avoidance area 231 is located at one side or two sides of the first end of the inner housing 20, the accommodating cavity 23 is in lateral communication with the outside through the avoidance area 231, and when the blade holder 40 rotates, the avoidance area 231 allows the blade holder 40 to rotate out of or into the accommodating cavity 23, to avoid interference between the blade 45 and the inner housing 20. Specifically, when the inner housing 20 is rotated out of the main accommodating chamber 12, the knife is in an unfolded state, a blade edge of the blade 45 extends out of the accommodating cavity 23 through the end opening 24, and the blade 45 can be rotated through the blade holder 40 and positioned at multiple angles for use. When the inner housing 20 is rotated into the main accommodating chamber 12, the knife is in a folded state, and the blade 45 and the inner housing 20 are accommodated in the main accommodating chamber 12, to prevent the blade 45 from being exposed to cause accidental injury, and reduce the length of the knife to facilitate carrying.

Figure 8:
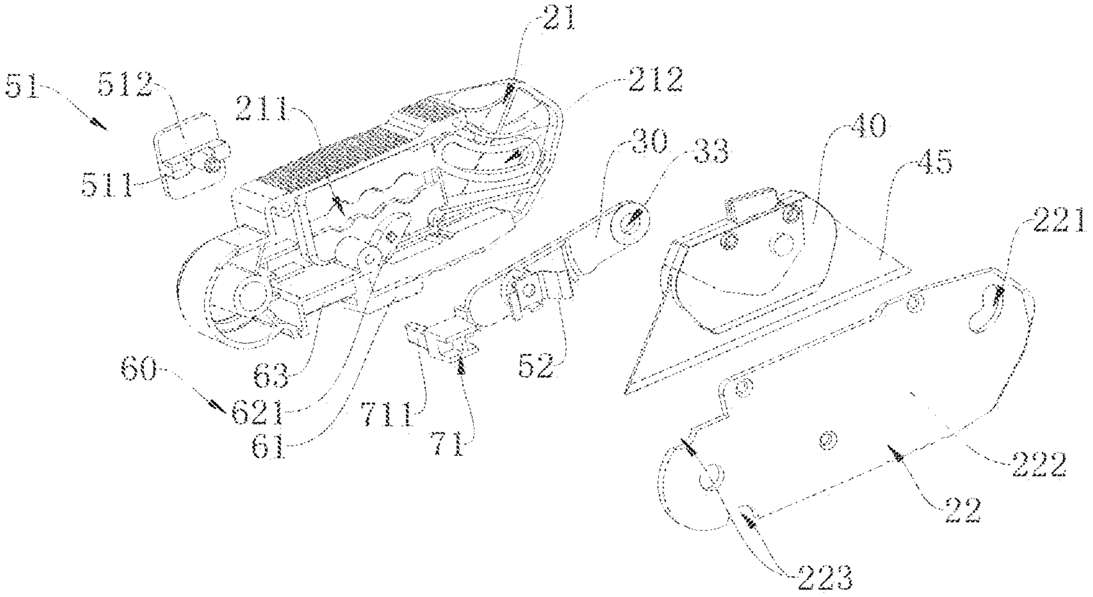
FIG. 8 is a partial exploded view of a multi-functional folding knife according to some embodiments of the present disclosure.
Figure 9:
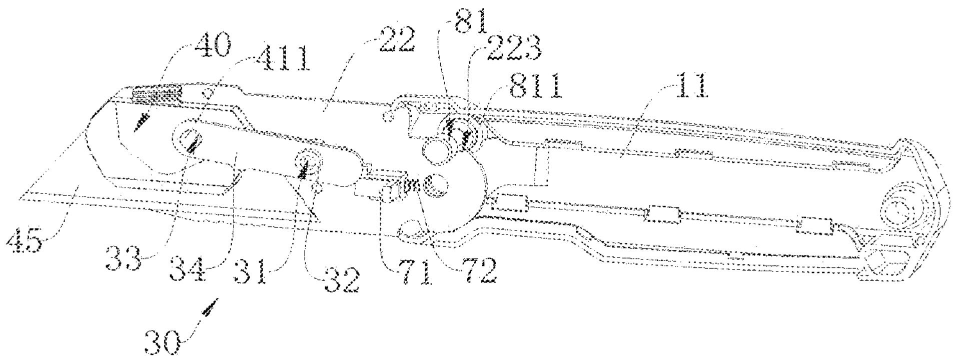
FIG. 9 is a structural diagram of an interior of a multi-functional folding knife according to some embodiments of the present disclosure.
Figure 10:
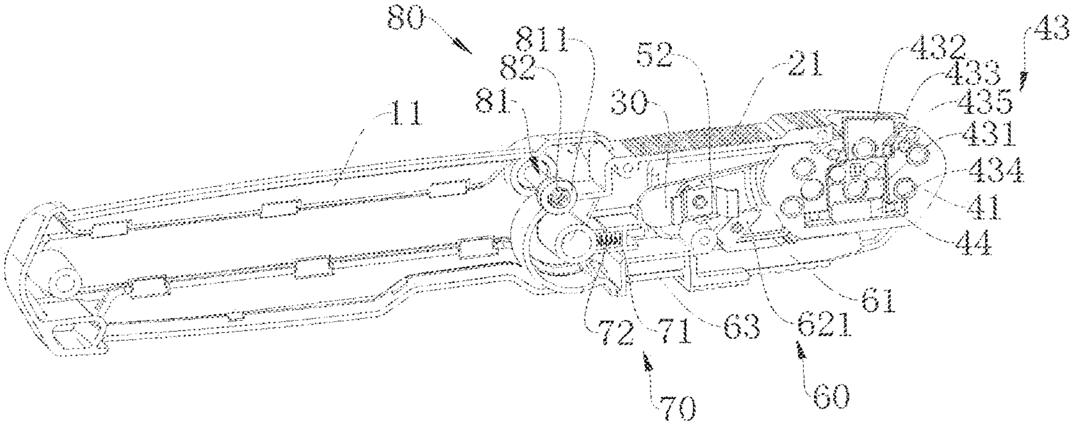
FIG. 10 is a structural diagram of an interior of a multi-functional folding knife according to some embodiments of the present disclosure.

As shown in FIG. 8 to FIG. 10, the first guide assembly includes a first guide rail 212 and a drive member 30, and the drive member 30 is drivably connected to a first side of the blade holder 40 to cause the blade holder 40 to move along the first guide rail 212. In other words, the drive member 30 is pivotally connected to the first side of the blade holder 40. A translation and/or rotation of the drive member 30 can drive the blade holder 40 to move along the first guide rail 212. The second guide assembly includes a fixed surface 222 and a second guide rail 221 provided on the fixed surface 222. A second side of the blade holder 40 is pivotally connected to the second guide rail 221 to cause the blade holder 40 to move along the second guide rail 221.

It can be understood that the blade holder 40 is connected to both the first guide rail 212 and the second guide rail 221 and can move along the first guide rail 212 and the second guide rail 221, and under the joint guidance of the first guide rail 212 and the second guide rail 221, the blade holder 40 can translate and/or rotate. In other words, when the drive member 30 translates and/or rotates relative to the fixed surface 222, the blade holder 40 is selectively rotated into or out of the accommodating cavity 23, so that an orientation of the blade holder 40 is changed to a plurality of positioning angles between a longitudinal position and a transverse position alternately, enabling the knife to serve as a cutter knife or a scraper knife. The knife is convenient to operate, can improve the working efficiency, and has a compact structure.

In some embodiments, as shown in FIG. 7 to FIG. 10, the multi-functional folding knife further includes a sliding assembly 50, the drive member 30 is provided with a driving surface 34, and the sliding assembly 50 is mounted on the driving surface 34 to drive the drive member 30 to translate and/or rotate. Specifically, by pushing the sliding assembly 50 to move longitudinally along an axial direction, the drive member 30 can be driven to translate and/or rotate, to further drive the blade holder 40 to translate and/or rotate, so that the blade holder 40 can be rotated out of or into the accommodating cavity 23 and thus turned to multiple angles.

Figure 7:
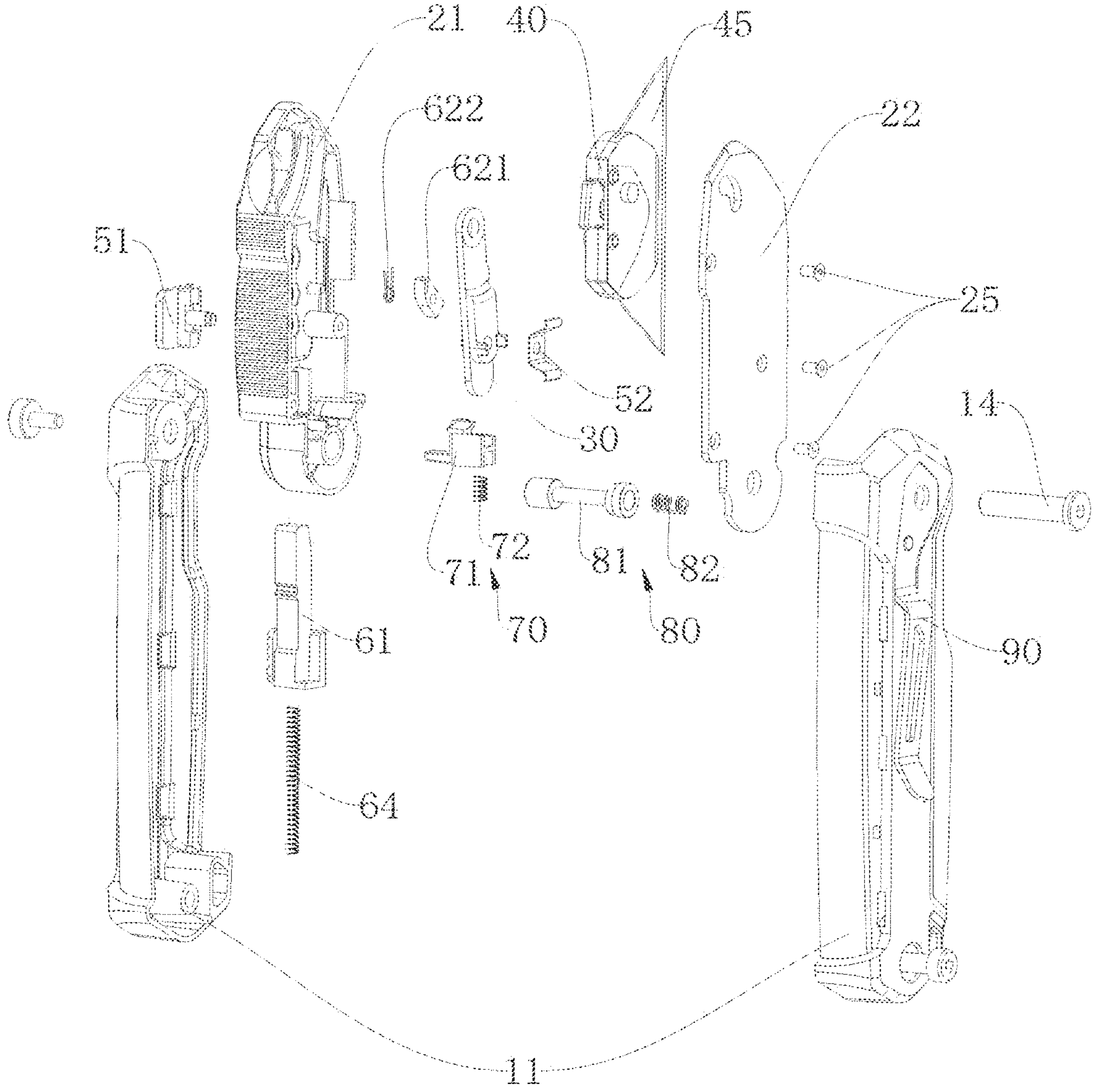
FIG. 7 is a partial exploded view of a multi-functional folding knife according to some embodiments of the present disclosure.

Specifically, as shown in FIG. 7 and FIG. 8, the blade holder 40 includes a first guide member 411 and a second guide member 421. The first guide member 411 and the second guide member 421 are respectively arranged on the first side and the second side of the blade holder 40 in a staggered manner. The first guide member 411 protrudes from the first side of the blade holder 40 and is pivotally connected to a first end of the driving surface 34 and the first guide rail 212 to drive the blade holder 40 to translate and/or rotate along the first guide rail 212. The second guide member 421 protrudes from the second side of the blade holder 40 and is pivotally connected to the second guide rail 221 to drive the blade holder 40 to translate and/or rotate along the second guide rail 221, so that a longitudinal driving force applied by the sliding assembly 50 to the drive member 30 is converted to a force for turning the drive member 30 to the blade holder 40 to the plurality of positioning angles.

In other words, the first guide member 411 is pivotally connected to the drive member 30, so that the blade holder 40 is driven by the drive member 30 to move. In addition, the first guide member 411 is pivotally connected to the first guide rail and is moved in engagement with the first guide rail 212 and the second guide member 421 is moved in engagement with the second guide rail 221 to generate deflection and guidance, so as to generate a thrust force to push the blade holder 40 in a rotational direction, to cause the blade holder 40 to rotate to a preset position, so that the blade 45 can be used longitudinally, transversely, or obliquely for different purposes, thereby expanding the application range of the knife.

Specifically, a first end of the drive member 30 is provided with a first connecting hole 33, a second end of the drive member 30 is provided with a second connecting hole 31, the first guide member 411 on the blade holder 40 is pivotally connected to the first connecting hole 33, and the sliding assembly 50 is pivotally connected to the second connecting hole 31. When being pushed to longitudinally move along the axial direction, the sliding assembly 50 can push the drive member 30 to translate and/or rotate, and further drive the first guide member 411 to move along the first guide rail 212, and at the same time, the second guide member 421 moves along the second guide rail 221, to cause the blade holder 40 to smoothly translate and/or rotate along the accommodating cavity 23, so that the knife can be positioned at multiple angles.

In some embodiments, as shown in FIG. 15 to FIG. 18, the first guide rail 212 and the second guide rail 221 are respectively of arc-shaped structures with different trajectories, the first guide rail 212 extends forward in a direction deviating from the second guide rail 221, and the second guide rail 221 extends outward in a direction deviating from the first guide rail 212, so that the blade holder 40 is gradually turned under acting forces in two different directions and thus gradually rotated out of or back into the accommodating cavity 23 through the end opening 24. As such, an orientation of the blade 45 on the blade holder 40 is changed to the plurality of positioning angles between the longitudinal position and the transverse position.

Specifically, projections of the first guide member 411 and the second guide member 421 on the fixed surface 222 do not overlap, and a distance between the projections of the first guide member 411 and the second guide member 421 on the fixed surface 222 remains unchanged. Therefore, when the extending direction of the first guide rail 212 deviates from the extending direction of the second guide rail 221, the first guide member 411 moves along the first guide rail 212, and the second guide member 421 moves along the second guide rail 221, relative positions of the first guide member 411 and the second guide member 421 on the fixed surface 222 are changed under the guidance of the first guide rail 212 and the second guide rail 221, so that the blade holder 40 can smoothly translate and/or rotate. As such, the knife can be positioned at multiple angles to realize multiple functions. The knife is easy to store and carry.

In some embodiments, as shown in FIG. 7 to FIG. 10, the inner housing 20 further includes a first housing 21 and a second housing 22. The first housing 21 and the second housing 22 are mounted and fixed by a fastener 25. The drive member 30 is accommodated in the accommodating cavity 23 between the first housing 21 and the second housing 22, and is located between the first housing 21 and the blade holder 40. The first housing 21 is provided with the first guide rail 212 and a positioning slot 211. The first guide rail 212 is formed on an inner surface of the first housing 21 and is pivotally connected to the first guide member 411 on the blade holder 40. The positioning slot 211 is formed on a surface of the first housing 21 and extends along the axial direction. The drive member 30 is configured to be elastically locked in the positioning slot 211 to lock the blade 45 on the blade holder 40 in the longitudinal position, the transverse position, or a transitional position between the longitudinal position and the transverse position. For example, the blade 45 forms an angle of 30°, 45°, or 60° with the axis. The fixed surface 222 is located on a surface of the second housing 22, and the second guide rail 221 is formed on the surface of the second housing 22 and is pivotally connected to the second guide member 421 on the blade holder 40. In other words, the blade holder 40 is movably connected to the first housing 21 and the second housing 22 by the first guide member 411 and the second guide member 421. The movement trajectory of the blade holder 40 is jointly defined by the first guide rail 212 on the second side of the first housing 21 and the second guide rail 221 on the surface of the second housing 22, so that the blade 45 can be smoothly adjusted to a plurality of positioning positions without requiring the use of an additional complicated accessory, thereby reducing the production costs.

In some embodiments, as shown in FIG. 8 to FIG. 11, a second end of the sliding assembly 50 passes through the positioning slot 211 and is pivotally connected to the drive member 30, the sliding assembly 50 is configured to move along the positioning slot 211, and further, the sliding assembly 50 is pushed to drive the drive member 30 to cause the blade holder 40 to translate and/or rotate. Specifically, the sliding assembly 50 includes a sliding support 51 and a sliding elastic piece 52. The sliding support 51 passes through the positioning slot 211 and is pivotally connected to the second connecting hole 31 on the drive member 30. The sliding elastic piece 52 is connected to the sliding support 51 and abuts between the drive member 30 and the second housing 22. The drive member 30 is movably locked in the positioning slot 211 by pressing the sliding support 51. A sliding panel 512 is arranged on an end of the sliding support 51 extending out of an outer side of the first housing 21, to push the sliding assembly 50 to move along the positioning slot 211.

Further, as shown in FIG. 15 to FIG. 18, the positioning slot 211 includes a movement region 2111 and a plurality of positioning regions 2112, the movement region 2111 is elongated and extends longitudinally along the axial direction, and the plurality of positioning regions 2112 are distributed at intervals. An engaging portion 511 is arranged on a side of the sliding support 51 facing the drive member 30 and is elongated. The engaging portion 511 is configured to move along the movement region 2111 of the positioning slot 211. A positioning portion 32 is arranged on and protrudes from a side of the drive member 30 facing the positioning slot 211. The positioning portion 32 is configured to engage with a positioning region 2112 of the plurality of positioning regions 2112 to lock the drive member 30, so that the blade holder 40 is retained in a target position.

In other words, the engaging portion 511 of the sliding support 51 is configured to move along the movement region 2111 of the positioning slot 211, and the positioning portion 32 of the drive member 30 is configured to detachably engage with a positioning region 2112 of the positioning regions 2112 of the positioning slot 211 to position the blade holder 40 and thus position the blade 45. In an optional embodiment, the positioning portion 32 is arranged concentrically with the second connecting hole 31 to achieve a compact structure and simplify the operation.

Specifically, the sliding support 51 is pressed and pushed to compress the sliding elastic piece 52, so that the sliding support 51 and the drive member 30 move inward, the positioning portion 32 of the drive member 30 is disengaged from the positioning region 2212 of the positioning slot 211 of the first housing 21, and the engaging portion 511 of the sliding support 51 moves in engagement with the movement region 2111 of the positioning slot 211. As such, the sliding assembly 50 can drive the drive member 30 to translate and/or rotate. Then, the sliding support 51 is released. The sliding elastic piece 52 allows the sliding support 51 and the drive member 30 to move outward, the engaging portion 511 of the sliding support 51 is disengaged from the movement region 2111 of the positioning slot 211, and the positioning portion 32 of the drive member 30 is engaged with one of the positioning regions 2112 to lock the drive member 30 and thus position the blade holder 40. The position of the blade holder 40 can be changed and locked by one-handed operation, thereby improving the convenience and safety of operation. In addition, with the arrangement of the first guide rail 212 and the second guide rail 221, the blade holder 40 can be smoothly moved and turned, and the sliding assembly 50 can be pressed and pushed more easily and smoothly.

Figure 11:
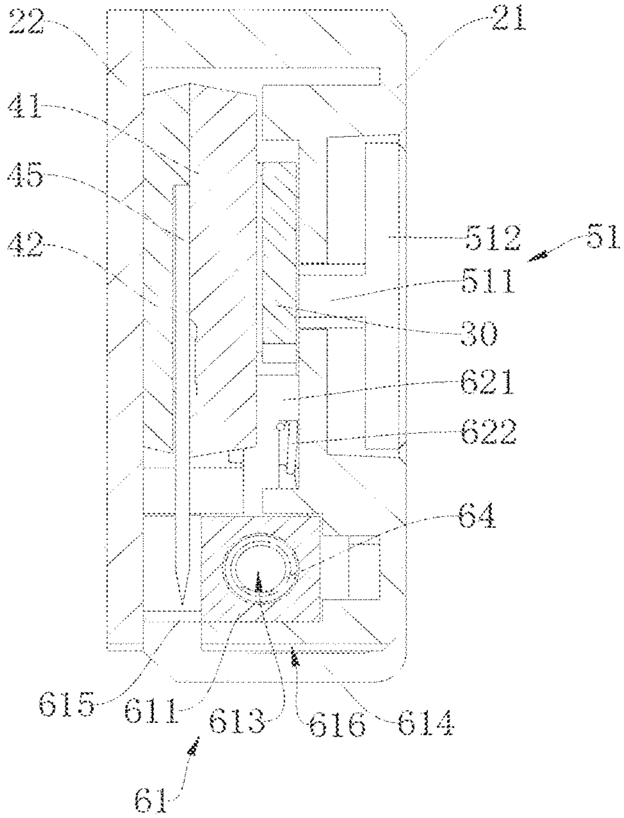
FIG. 11 is a cross-sectional view of a multi-functional folding knife according to some embodiments of the present disclosure.
Figure 12:
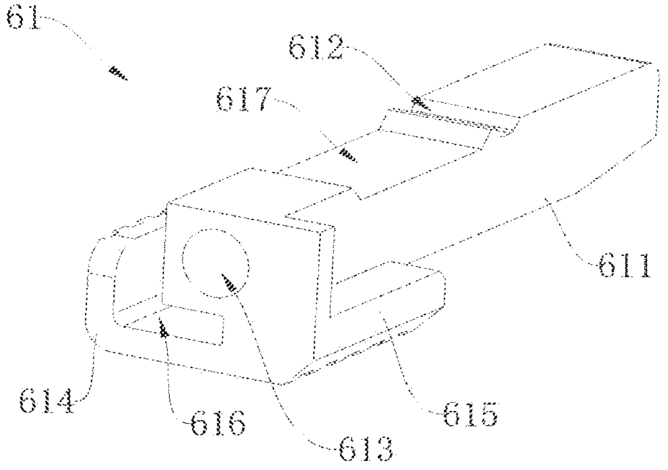
FIG. 12 is a schematic structural diagram of a safety push button according to some embodiments of the present disclosure.

In some embodiments, as shown in FIG. 10 to FIG. 12, the multi-functional folding knife further includes a safety assembly 60. The safety assembly 60 includes a safety push button 61, a safety spring 64, and an engaging member 621. The safety push button 61 is longitudinally movably arranged on a side edge of the first housing 21 to stop the blade 45. The safety spring 64 extends longitudinally along the axial direction and presses against the safety push button 61, so that when the blade holder 40 leaves the longitudinal position, a first end of the safety push button 61 is pressed against the blade holder 40 to avoid the blade 45, and when the blade holder 40 moves back to the longitudinal position, the safety push button 61 is reset to stop the blade 45. An engaging groove 612 is provided on a first side of the safety push button 61. The engaging member 621 is arranged on the inner surface of the first housing 21 and is configured to elastically and rotatably press against the drive member 30. The engaging member 621 is configured to detachably engage with the engaging groove 612. When the blade holder 40 is located in the longitudinal position, the engaging member 621 is configured to engage with the engaging groove 612, and the safety push button 61 avoids the blade 45 to allow the blade 45 to be rotated out of the accommodating cavity 23. When the blade holder 40 leaves the longitudinal position, the engaging member 621 is disengaged from the engaging groove 612 under an action of the drive member 30, so that the first end of the safety push button 61 presses against the blade holder 40.

Specifically, the safety push button 61 includes a base 611, a guide groove 613, a bent portion 614, and a stop portion 615. The guide groove 613 is provided on the base 611 to accommodate the safety spring 64 and is configured to engage with a guiding member 63, so that the base 611 is accommodated in the accommodating cavity 23 and is longitudinally movable along the guiding member 63. The engaging groove 612 and an elongated groove 617 are provided on a first side of the base 611 and are spaced apart from each other. The engaging member 621 rotatably presses against the drive member 30 and is configured to move along the elongated groove 617 or engage with the engaging groove 612. The bent portion 614 extends in a bent configuration from the base 611 toward the outer side of the inner housing 20 and is exposed to the outer side of the inner housing 20, so that pushing of the bent portion 614 can cause the safety push button 61 to move along the guiding member 63. A slide groove 616 is formed between the base 611 and the bent portion 614 to be movably connected to the first housing 21. The stop portion 615 extends from the base 611 toward the avoidance area 231 to cover at least a part of the avoidance area 231. When the blade 45 is located in the longitudinal position, the stop portion 615 is located below the blade 45 to stop the blade 45 from rotating out of the accommodating cavity 23. When the engaging member 621 is engaged with the engaging groove 612 or the first end of the safety push button 61 presses against the blade holder 40, the safety push button 61 is moved, so that the stop portion 615 avoids the blade 45 to allow the blade 45 to be rotated out of or into the accommodating cavity 23.

In a specific embodiment, the first guide member 411 and the second guide member 421 respectively arranged on the first side and the second side of the blade holder 40 are located on an identical straight line parallel to the blade edge of the blade, a starting end of the first guide rail 212 and a starting end of the second guide rail 221 are located on an identical straight line parallel to the axis, the first guide rail 212 extends forward in a direction deviating from the second guide rail 221, the second guide rail 221 extends outward in a direction away from the first guide rail 212, and a terminal end of the first guide rail 212 and a terminal end of the second guide rail 221 are located on an identical straight line perpendicular to the axis. When the first guide member 411 is located at the starting end of the first guide rail 212 and the second guide member 421 is located at the starting end of the second guide rail 221, the blade holder 40 is located in the longitudinal position, and the blade 45 extends out of the end opening 24 to serve as a longitudinal cutter knife. When the first guide member 411 turns and moves along the first guide rail 212 and the second guide member 421 turns and moves along the second guide rail 221, the blade holder 40 is rotated out of the accommodating cavity 23 by a turning angle of substantially 0° to 90° or 90° to 180°. In this case, the blade 45 enters an oblique state. When the first guide member 411 is located at the terminal end of the first guide rail 212 and the second guide member 421 is located at the terminal end of the second guide rail 221, the blade holder 40 is rotated to the transverse position, and the blade 45 enters a transverse state to serve as a transverse scraper knife.

Figure 15:
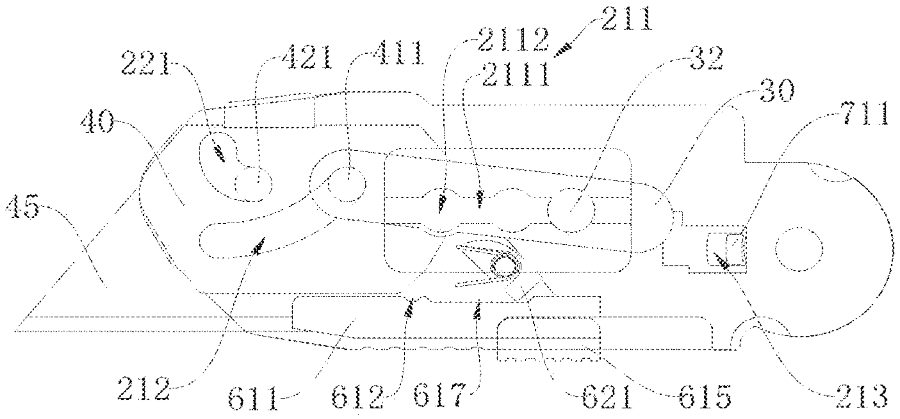
FIG. 15 is a schematic diagram of a multi-functional folding knife in a longitudinal position according to some embodiments of the present disclosure.

Specifically, as shown in FIG. 15, when the inner housing 20 is in an unfolded position, and the positioning portion 32 of the drive member 30 is located in the positioning region 2112 on the right side of the positioning slot 211 of the first housing 21, the drive member 30 is located at a rightmost position. It can be understood that the sliding assembly 50 is also located at a rightmost position, the first guide member 411 of the blade holder 40 is connected to the first connecting hole 33 at the first end of the drive member 30, the first guide member 411 of the blade holder 40 is located at the end on a right side of the first guide rail 212, the second guide member 421 of the blade holder 40 is located at the end on a right side of the second guide rail 221, and the blade holder 40 is located in the longitudinal position, so that the blade edge of the blade 45 is parallel to the axis to serve as a cutter knife. In this case, the safety push button 61 is located at an initial position, i.e., a leftmost position, a first end of the engaging member 621 presses against the drive member 30, a second end of the engaging member 621 presses against the safety push button 61, the contact point is located on the right side of the elongated groove 617, and the stop portion 615 is located below the blade 45 to stop the blade 45 from rotating.

Figure 16:
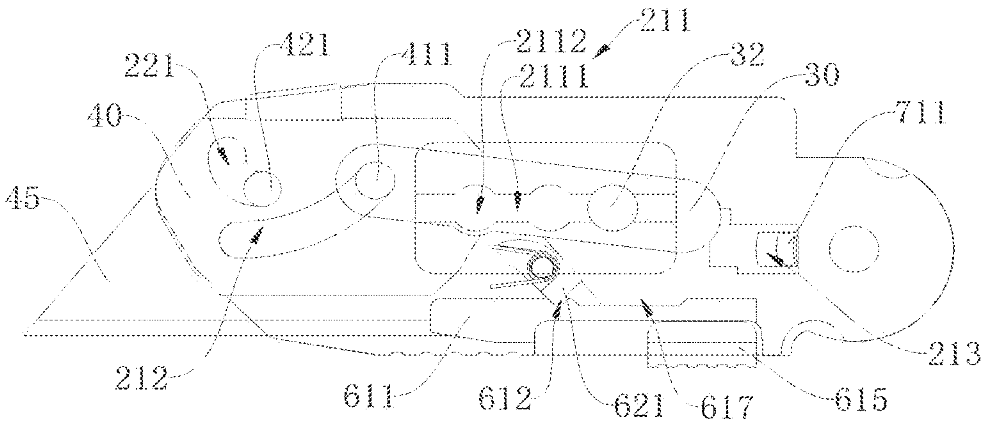
FIG. 16 is a schematic diagram showing that a multi-functional folding knife is in a longitudinal position and is ready to rotate according to some embodiments of the present disclosure.

As shown in FIG. 16, the safety push button 61 is moved rightward. In this case, the first end of the engaging member 621 presses against the drive member 30, and the second end of the engaging member 621 presses against the safety push button 61 and is engaged with the engaging groove 612, so that the stop portion 615 deviates from the blade 45, and the blade holder 40 does not interfere with the blade 45 when driving the blade 45 to rotate.

Figure 17:
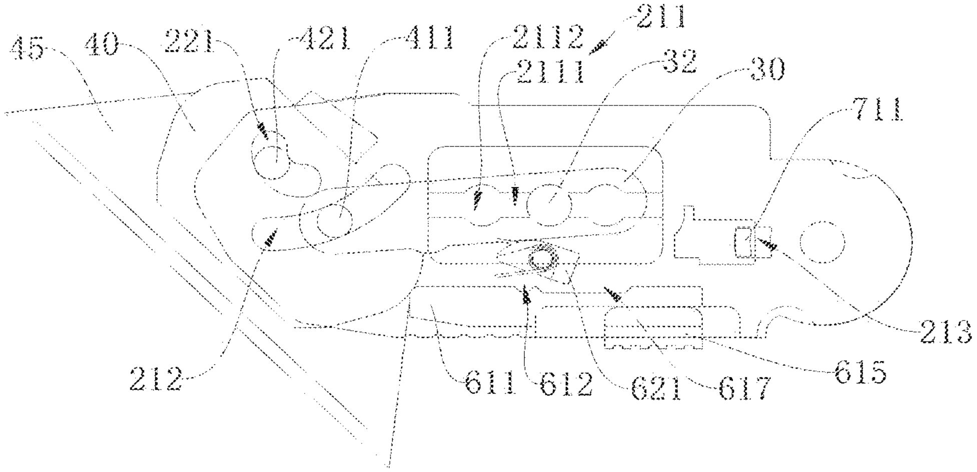
FIG. 17 is a schematic diagram of a multi-functional folding knife in a transitional position according to some embodiments of the present disclosure.

As shown in FIG. 17, the sliding assembly 50 is pressed, so that the positioning portion 32 of the drive member 30 is disengaged from the positioning region 2112 of the positioning slot 211 of the first housing 21, and the engaging portion 511 of the sliding support 51 is engaged with the movement region 2111. The sliding assembly 50 can drive the drive member 30 to translate and/or rotate to further cause the first guide member 411 of the blade holder 40 to turn and move along the first guide rail 212 and cause the second guide member 421 of the blade holder 40 to turn and move along the second guide rail 221, so that the first guide member 411 moves to a middle part of the first guide rail 212 and the second guide member 421 moves to a middle part of the second guide rail 221. Then, the sliding assembly 50 is released. The sliding elastic piece 52 causes the sliding support 51 and the drive member 30 to move outward, and the positioning portion 32 of the drive member 30 is engaged with one of the positioning regions 2112 in a middle of the slide groove 616 of the first housing 21 to lock the blade holder 40 in the transitional position. In this case, the blade edge of the blade 45 is completely exposed out of the inner housing 20 and forms an angle of 45° with the housing 10 for use as an oblique scraper knife.

It can be understood that when the drive member 30 moves and/or rotates, the engaging member 621 is driven by the drive member 30 to rotate counterclockwise in the direction shown in FIG. 17 to detach from the engaging groove 612, and further, an acting force of the safety spring 64 causes the safety push button 61 to move forward, so that the first end of the base 611 of the safety push button 61 presses against the blade holder 40, to prevent the safety push button 61 from being completely reset. In this case, the stop portion 615 still deviates from the blade 45 and therefore does not interfere with the blade 45, thereby ensuring that the blade holder 40 can drive the blade 45 to smoothly rotate.

Figure 18:
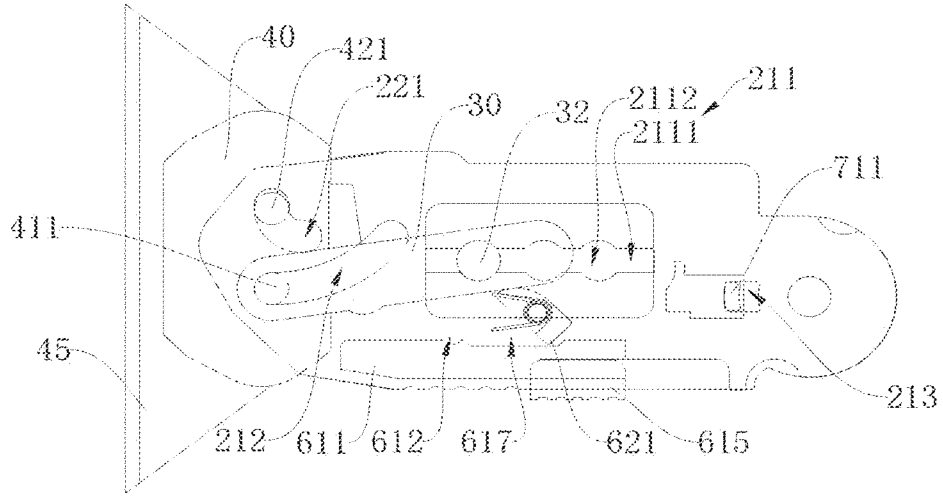
FIG. 18 is a schematic diagram of a multi-functional folding knife in a transverse position according to some embodiments of the present disclosure.

As shown in FIG. 18, the sliding assembly 50 is pressed, so that the positioning portion 32 of the drive member 30 is disengaged from the positioning region 2112 of the positioning slot 211 of the first housing 21, and the engaging portion 511 of the sliding support 51 is engaged with the movement region 2111. The sliding assembly 50 can drive the drive member 30 to translate and/or rotate, to further cause the first guide member 411 of the blade holder 40 to turn and move along the first guide rail 212 and cause the second guide member 421 of the blade holder 40 to turn and move along the second guide rail 221, so that the first guide member 411 moves to the end on a left side of the first guide rail 212 and the second guide member 421 moves to the end on a left side of the second guide rail 221. Then, the sliding assembly 50 is released. The sliding elastic piece 52 causes the sliding support 51 and the drive member 30 to move outward, and the positioning portion 32 of the drive member 30 is engaged with one of the positioning regions 2112 on a left side of the slide groove 616 of the first housing 21 to lock the blade holder 40 in the transverse position. In this case, the blade edge of the blade 45 is completely exposed out of the inner housing 20 and forms an angle of 90° with the housing 10 for use as a transverse scraper knife. It can be understood that by further extending the second guide rail 221, the blade holder 40 can continue to translate or rotate, so that the blade edge of the blade 45 forms an angle of 135°, or even 180°, or any other angle in the range of 90° to 180° with the inner housing 20.

It can be understood that when the drive member 30 translates and/or rotates, the acting force of the safety spring 64 causes the safety push button 61 to move forward, the first end of the base 611 of the safety push button 61 presses against the blade holder 40, and the engaging member 621 rotates clockwise in the direction shown in FIG. 18 under the action of an engaging spring 622. The first end of the engaging member 621 presses against the drive member 30, the second end of the engaging member 621 presses against the safety push button 61, and the contact point moves rightward along the elongated groove 617. In this case, the stop portion 615 still deviates from the blade 45 and therefore does not interfere with the blade 45, so that the blade holder 40 can drive the blade 45 to smoothly rotate. When the blade holder 40 is located in the longitudinal position, the safety push button 61 is completely reset, and the contact point between the engaging member 621 and the safety push button 61 is located at a rightmost position on the elongated groove 617.

Further, when the sliding assembly 50 is pressed to move rightward, the blade holder 40 is rotated from the transverse position to the longitudinal position through the transitional position, and the blade holder 40 presses against the first end of the base 611 of the safety push button 61. The rotation of the blade holder 40 causes the safety push button 61 to overcome resistance of the safety spring 64 and move rightward, so that the stop portion 615 does not interfere with the blade 45 to hinder the rotation of blade holder 40. In this case, the contact point between the engaging member 621 and the safety push button 61 moves leftward along the elongated groove 617. When the blade holder 40 approaches the longitudinal position, the blade holder 40 is separated from the safety push button 61, the acting force of the safety spring 64 causes the safety push button 61 to move forward and reset, the contact point between the engaging member 621 and the safety push button 61 is located at the rightmost position on the elongated groove 617, and the stop portion 615 is located below the blade 45 to stop the blade 45 from rotating.

Figure 3:
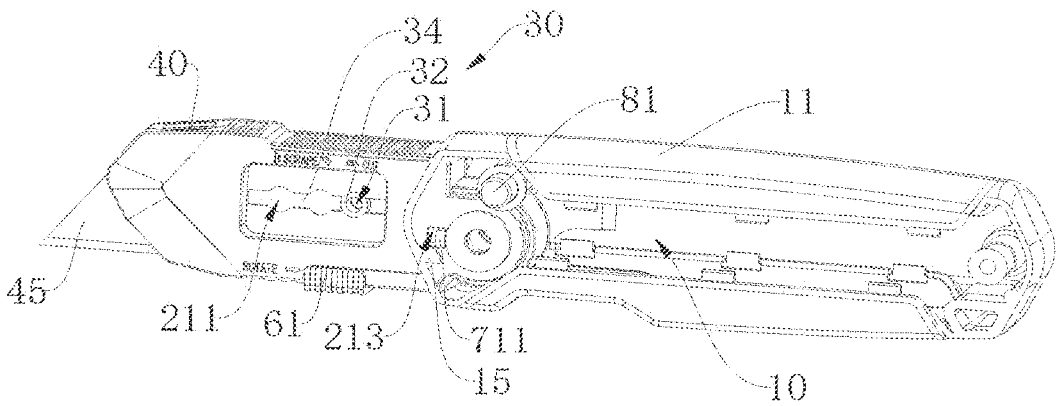
FIG. 3 is a cross-sectional view of a multi-functional folding knife in an unfolded longitudinal position according to some embodiments of the present disclosure.
Figure 4:
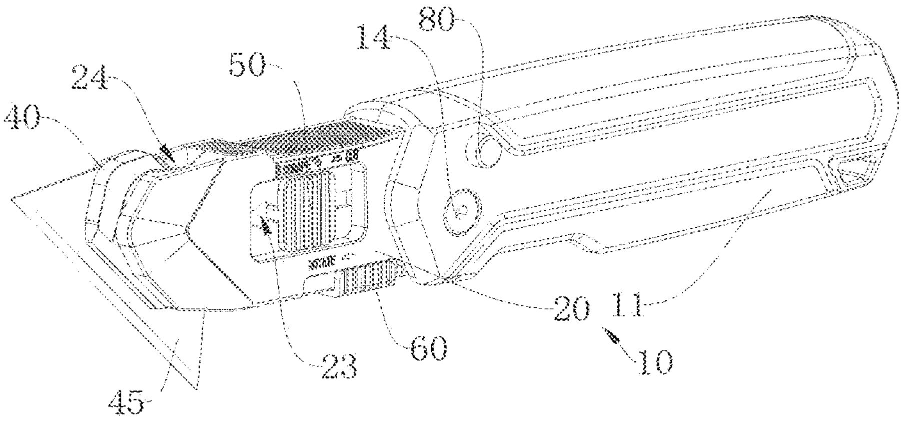
FIG. 4 is a schematic structural diagram of a multi-functional folding knife in an unfolded transitional position according to some embodiments of the present disclosure.
Figure 5:
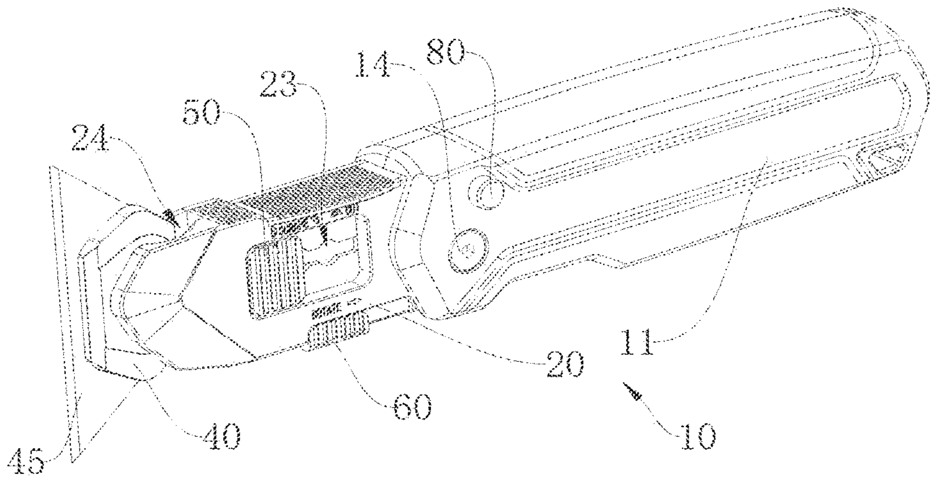
FIG. 5 is a schematic structural diagram of a multi-functional folding knife in an unfolded transverse position according to some embodiments of the present disclosure.
Figure 6:
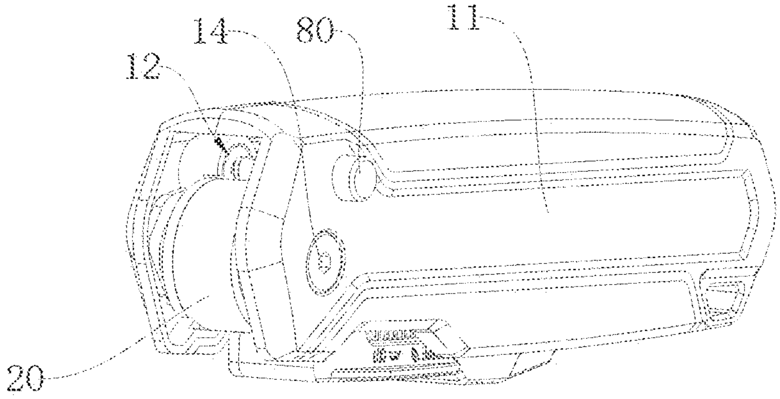
FIG. 6 is a schematic structural diagram of a multi-functional folding knife in a folded position according to some embodiments of the present disclosure.

In some embodiments, as shown in FIG. 7, the multi-functional folding knife further includes a self-locking assembly 70. The self-locking assembly 70 includes a self-locking push button 71 and a self-locking spring 72. The self-locking push button 71 is longitudinally movably arranged on the inner housing 20 and is configured to press against the drive member 30. The self-locking spring 72 is configured to provide an acting force to the self-locking push button 71 for causing the self-locking push button 71 to move toward the drive member 30. As shown in FIG. 3, the self-locking push button 71 includes a first self-locking portion 711 protruding from the self-locking push button 71, the first housing 21 is provided with a self-locking hole 213, the first self-locking portion 711 passes through the self-locking hole 213 and extends toward the outer housing 11, the outer housing 11 includes a second self-locking portion 15 protruding from an inner surface of the outer housing 11, and the drive member 30 acts on the self-locking push button 71, so that the first self-locking portion 711 detachably presses against the second self-locking portion 15.

Specifically, as shown in FIG. 3, FIG. 15, and FIG. 18, when the multi-functional folding knife is in the unfolded state, the second self-locking portion 15 on the outer housing 11 is located on a side of the self-locking hole 213 on the first housing 21. As shown in FIG. 15, further, when the blade 45 is located in the longitudinal position, the drive member 30 presses against the self-locking push button 71, and the self-locking spring 72 is compressed, so that the self-locking push button 71 moves backward longitudinally along the axial direction, and further causes the first self-locking portion 711 to detach from the second self-locking portion 15, to allow the inner housing 20 to be rotated and folded into the main accommodating chamber 12 relative to the outer housing 11.

As shown in FIG. 17 and FIG. 18, when the blade 45 leaves the longitudinal position, the drive member 30 detaches from the self-locking push button 71, and the self-locking spring 72 pushes the self-locking push button 71 to move forward longitudinally along the axial direction and further cause the first self-locking portion 711 to press against the second self-locking portion 15, thereby preventing the inner housing 20 from rotating relative to the outer housing 11. As such, the multi-functional folding knife can be kept in the unfolded state to avoid an accidental injury caused by the blade 45 being unable to be smoothly accommodated in the main accommodating chamber 12.

It can be understood that when the blade 45 is located in the longitudinal position, the inner housing 20 rotates relative to the outer housing 11, and the blade 45 can be smoothly accommodated in the main accommodating chamber 12. When the blade 45 is located in the transitional position and the transverse position, the blade 45 interferes with the outer housing 11 and is likely to cause damage to the outer housing 11 or accidental injury to the user, even if the inner housing 20 can rotate relative to the outer housing 11. Through the configuration of the self-locking assembly 70, the inner housing 20 can be rotated and folded to the outer housing 11 when the blade holder 40 is located in the longitudinal position, and the multi-functional folding knife can be kept in the unfolded state when the blade holder 40 is located in other positions to avoid an accidental injury caused by the blade 45 being unable to be smoothly accommodated in the main accommodating chamber 12.

Figure 2:
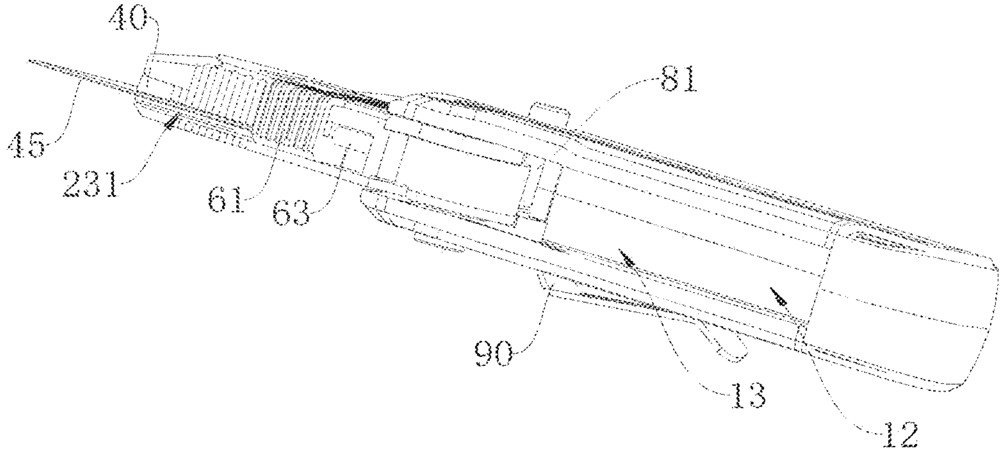
FIG. 2 is a schematic structural bottom view of a multi-functional folding knife in an unfolded longitudinal position according to some embodiments of the present disclosure.

In some embodiments, as shown in FIG. 2, FIG. 9, and FIG. 10, the multi-functional folding knife further includes a locking assembly 80. The locking assembly 80 includes a locking member 81 and a locking spring 82. The locking member 81 is elastically and pressably connected to the outer housing 11 by the locking spring 82. The locking member 81 includes a locking portion 811 protruding radially. The inner housing 20 is provided with a plurality of locking notches 223. The locking portion 811 is detachably engaged with a locking notch 223 of the plurality of locking notches 223 to keep the inner housing 20 in an unfolded state or a folded state.

Specifically, the locking member 81 is pressed to compress the locking spring 82, so that the locking portion 811 is disengaged from a respective one of the locking notches 223, and the inner housing 20 can be rotated out of or into the main accommodating chamber 12 relative to the outer housing 11. Then, the locking member 81 is released. When the locking portion 811 is engaged with a respective one of the locking notches 223, the inner housing 20 is kept in the unfolded state or the folded state.

In a specific embodiment, the locking notches 223 are respectively provided on two sides of the second housing 22, and when the locking portion 811 is engaged with a respective locking notch 223 on one side of the second housing 22, the inner housing 20 is kept in the unfolded state. As such, the inner housing 20 can be prevented from rotating relative to the outer housing 11 to cause potential safety hazards during use, thereby facilitating a cutting or scraping operation. When the locking portion 811 is engaged with a respective locking notch 223 on the other side of the second housing 22, the inner housing 20 is kept in the folded state. As such, the inner housing 20 can be prevented from rotating out of the main accommodating chamber 12 to expose the blade and cause potential safety hazards during storage or carrying.

Figure 13:
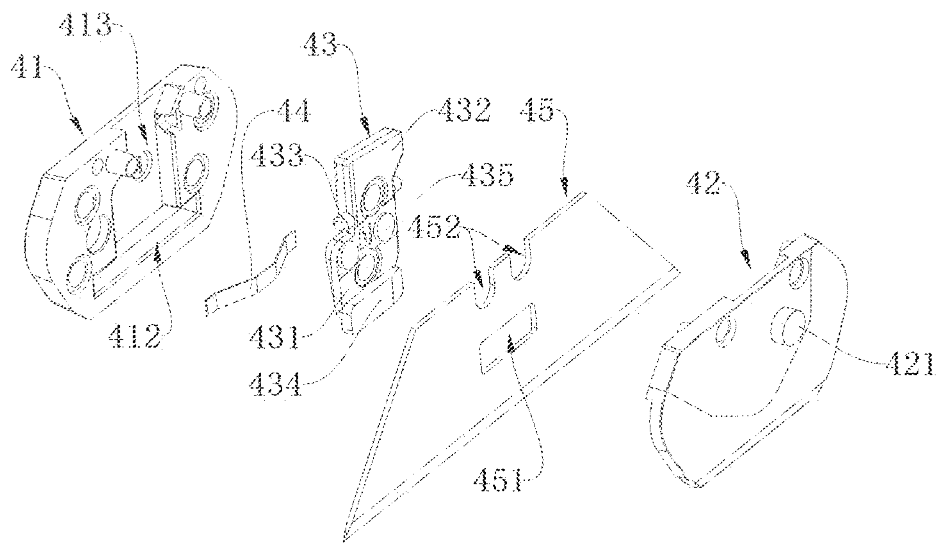
FIG. 13 is an exploded view of a blade holder according to some embodiments of the present disclosure.
Figure 14:
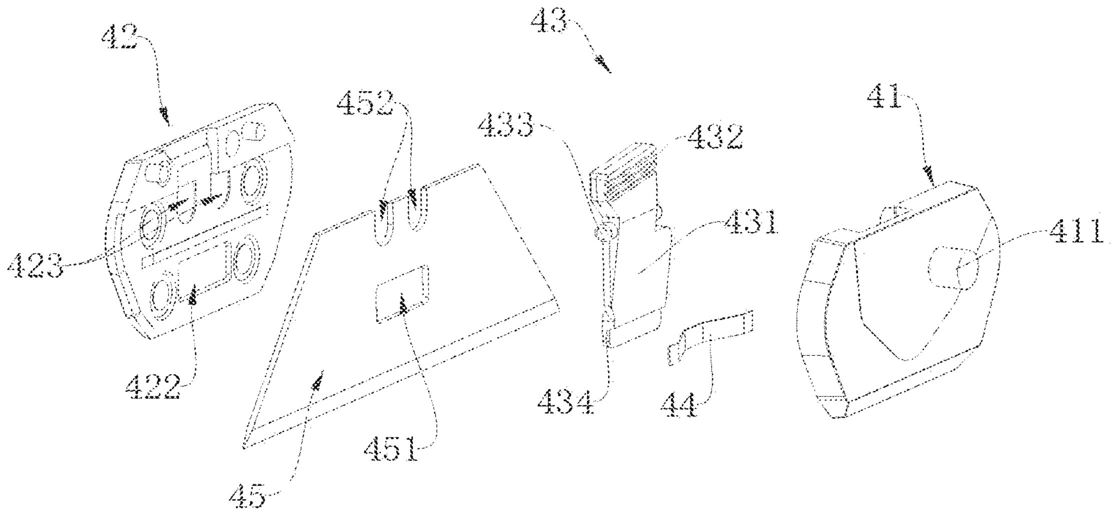
FIG. 14 is an exploded view of a blade holder according to some embodiments of the present disclosure.

In some embodiments, as shown in FIG. 13 and FIG. 14, the blade holder 40 includes a first frame 41, a middle frame 43, a second frame 42, and a frame elastic piece 44. An elastic piece groove 412 and a first mounting groove 413 are provided on a side of the first frame 41 facing the second frame 42. The middle frame 43 is accommodated in the first mounting groove 413 and is rotatably connected to the first frame 41 and the second frame 42. The frame elastic piece 44 is accommodated in the elastic piece groove 412 to provide an acting force for pressing the middle frame 43 against the second frame 42, so that the blade 45 is detachably mounted between the second frame 42 and the middle frame 43. The first guide member 411 protrudes radially outward from the first frame 41, is pivotally connected to the first connecting hole 33 at the first end of the drive member 30, is connected to the first guide rail 212 on the inner side of the first housing 21, and is driven by the drive member 30 to move along the first guide rail 212. The second guide member 421 protrudes radially outward from the second frame 42 eccentrically with respect to the first guide member 411 and is connected to the second guide rail 221 of the second housing 22.

Specifically, the middle frame 43 includes a main body 431, a shaft portion 433, and an extension portion 432. The shaft portion 433 is located on two sides of a first end of the main body 431 and is rotatably connected to the first frame 41. The extension portion 432 extends upward from the first end of the main body 431, is exposed to outside from a first end of the blade holder 40, and is movably located between the first frame 41 and the second frame 42. Further, a limiting portion 435 and a fixing portion 434 are arranged on and protrude from a side of a second end of the main body 431 facing the second frame 42. The blade 45 includes a limiting notch 452 and a mounting hole 451, and the limiting notch 452 and the mounting hole 451 extend through the blade 45. The limiting portion 435 on the main body 431 is configured to engage with the limiting notch 452. The fixing portion 434 is configured to pass through the mounting hole 451 to fix the blade 45. A second mounting groove 422 and a third mounting groove 423 are provided on a side of the second frame 42 facing the middle frame 43. The second mounting groove 422 is configured to accommodate an end of the fixing portion 434. The third mounting groove 423 is configured to avoid an end of the limiting portion 435.

It can be understood that the extension portion 432 and the main body 431 are respectively located on two sides of a central axis of the shaft portion 433, and the extension portion 432 is pulled to overcome an elastic force of the frame elastic piece 44 and cause the main body 431 to rotate away from the second frame 42 to further cause the fixing portion 434 at the second end of the main body 431 to separate from the mounting hole 451 for replacing the blade 45. In a specific embodiment, a thickness of the main body 431 gradually decreases from top to bottom, making the structure of the blade holder 40 more compact, thereby reducing the volume of the blade holder 40.

In some embodiments, as shown in FIG. 2 and FIG. 7, the multi-functional folding knife further includes a clip 90. The clip 90 is elastically arranged on an outer side surface of the outer housing 11 to clip the multi-functional folding knife to an object, such as a notebook, a pocket, etc., to avoid loss of the knife.

The basic principles, main features and advantages of the present disclosure have been described above. Those skilled in the art should understand that the present disclosure is not limited to the above-mentioned embodiments. The descriptions of the embodiments and the specification are only for illustrating the principles of the present disclosure. Various changes and improvements may be made to the present disclosure without departing from the spirit and scope of the present disclosure, and such changes and improvements all fall within the scope of protection claimed by the present disclosure. The scope of protection claimed by the present disclosure is defined by the appended claims and equivalents thereof.

What is claimed is:

1. A multi-functional folding knife, comprising:

a housing, wherein the housing comprises an outer housing and an inner housing, the inner housing is rotatably and foldably mounted in the outer housing, the inner housing is provided with an accommodating cavity and an end opening, and the end opening is provided at a first end of the inner housing;

a blade holder, wherein the blade holder is configured to hold a blade, and is rotatably mounted in the accommodating cavity;

a first guide assembly, wherein the first guide assembly comprises a first guide rail and a drive member, the drive member is drivably connected to a first side of the blade holder to cause the blade holder to move along the first guide rail, and the drive member is provided with a driving surface;

a second guide assembly, wherein the second guide assembly comprises a fixed surface and a second guide rail extends through the fixed surface, a second side of the blade holder is pivotally connected to the second guide rail to cause the blade holder to move along the second guide rail, and when the drive member moves relative to the fixed surface, the blade holder is selectively rotated into or out of the accommodating cavity, so that an orientation of the blade holder is changed to a plurality of positioning angles between a longitudinal position and a transverse position alternately; and a sliding assembly, wherein the sliding assembly is mounted on the driving surface to drive the drive member to move, wherein the blade holder comprises a first guide member and a second guide member, the first guide member and the second guide member are respectively arranged on the first side and the second side of the blade holder in a staggered manner, the first guide member protrudes from the first side of the blade holder and is pivotally connected to a first end of the driving surface and the first guide rail to drive the blade holder to move along the first guide rail, and the second guide member protrudes from the second side of the blade holder and is pivotally connected to the second guide rail to drive the blade holder to move along the second guide rail, so that a longitudinal driving force applied by the sliding assembly to the drive member is converted to a force applied by the drive member to move the blade holder to the plurality of positioning angles.

2. The multi-functional folding knife according to claim 1, wherein:

the first guide rail and the second guide rail are respectively of arc-shaped structures with different trajectories, the first guide rail extends forward in a direction deviating from the second guide rail, and the second guide rail extends outward in a direction deviating from the first guide rail, and when the blade holder is gradually turned under acting forces from the fixed surface and the driving surface, the blade holder is gradually rotated out of or back into the accommodating cavity through the end opening, so that an orientation of the blade on the blade holder is changed to the plurality of positioning angles between the longitudinal position and the transverse position.

3. The multi-functional folding knife according to claim 2, wherein the inner housing comprises a first housing and a second housing, the drive member is accommodated in the accommodating cavity between the first housing and the second housing and is located between the first housing and the blade holder, the first housing is provided with the first guide rail and a positioning slot, the first guide rail is formed on an inner surface of the first housing, the positioning slot is formed on a surface of the first housing, the fixed surface is located on a surface of the second housing, the second guide rail is formed on the surface of the second housing, the blade holder is movably connected to the first housing and the second housing by the first guide member and the second guide member, an end of the sliding assembly passes through the positioning slot and is connected to an end of the drive member to drive the drive member to cause the blade holder to move, and the drive member is configured to be elastically locked in the positioning slot to lock the blade on the blade holder in the longitudinal position, the transverse position, or a transitional position between the longitudinal position and the transverse position.

4. The multi-functional folding knife according to claim 3, further comprising a safety assembly, wherein:

the safety assembly comprises a safety push button, a safety spring, and an engaging member, the safety push button is longitudinally movably arranged on a side edge of the first housing to stop the blade, the safety spring extends longitudinally along an axial direction and presses against the safety push button, so that when the blade holder leaves the longitudinal position, a first end of the safety push button is pressed against the blade holder to avoid the blade, and when the blade holder moves back to the longitudinal position, the safety push button is reset to stop the blade, an engaging groove is provided on a side of the safety push button, the engaging member is arranged on the inner surface of the first housing and is configured to elastically and rotatably press against the drive member, and the engaging member is configured to detachably engage with the engaging groove, when the blade holder is located in the longitudinal position, the engaging member is configured to engage with the engaging groove, and the safety push button avoids the blade to allow the blade to be rotated out of the accommodating cavity, and when the blade holder leaves the longitudinal position, the engaging member is disengaged from the engaging groove under an action of the drive member, so that the first end of the safety push button presses against the blade holder.

5. The multi-functional folding knife according to claim 4, further comprising a self-locking assembly, wherein:

the self-locking assembly comprises a self-locking push button and a self-locking spring, the self-locking push button is longitudinally movably arranged on the inner housing and is configured to press against the drive member, the self-locking spring is configured to provide an acting force to the self-locking push button for causing the self-locking push button to move toward the drive member, the self-locking push button comprises a first self-locking portion protruding from the self-locking push button, the first housing is provided with a self-locking hole, the first self-locking portion passes through the self-locking hole and extends toward the outer housing, and the outer housing comprises a second self-locking portion protruding from an inner surface of the outer housing, when the multi-functional folding knife is in a first state in which the inner housing is exposed from the outer housing, the second self-locking portion is located on a side of the self-locking hole, when the blade leaves the longitudinal position, the first self-locking portion presses against the second self-locking portion, so that the multi-functional folding knife is kept in the first state, and when the blade is located in the longitudinal position, the drive member pushes the self-locking push button to cause the first self-locking portion to detach from the second self-locking portion to allow the inner housing to be rotated and folded relative to the outer housing.

6. The multi-functional folding knife according to claim 5, wherein the blade holder comprises a first frame, a middle frame, a second frame, and a frame elastic piece, the middle frame is rotatably connected to the first frame and the second frame, and the frame elastic piece is configured to provide an acting force for pressing the middle frame against the second frame, so that the blade is detachably mounted between the second frame and the middle frame, the first guide member protrudes radially outward from the first frame, and the second guide member protrudes radially outward from the second frame eccentrically with respect to the first guide member, and the middle frame comprises a main body, a shaft portion located on two sides of the main body, and an extension portion located at an end of the main body, the extension portion and the main body are respectively located on two sides of a central axis of the shaft portion, the extension portion is exposed to an outside from an end of the blade holder and is movably located between the first frame and the second frame, and the extension portion is pulled to overcome an elastic force of the frame elastic piece and cause the main body to rotate away from the second frame for replacing the blade.

7. The multi-functional folding knife according to claim 6, further comprising a locking assembly, wherein the locking assembly comprises a locking member and a locking spring, the locking member is elastically and pressably connected to the outer housing, the locking member comprises a locking portion protruding radially, the inner housing is provided with a plurality of locking notches, and the locking portion is detachably engaged with a locking notch of the plurality of locking notches to keep the inner housing in a first state in which the inner housing is exposed from the outer housing or a second state in which the inner housing is disposed within the outer housing.

8. The multi-functional folding knife according to claim 7, wherein:

an elastic piece groove for mounting the frame elastic piece and a first mounting groove for accommodating the middle frame are provided on a side of the first frame facing the second frame, the blade comprises a limiting notch and a mounting hole, the limiting notch and the mounting hole extend through the blade, a limiting portion and a fixing portion are arranged on and protrude from a side of the main body facing the second frame, the limiting portion is configured to engage with the limiting notch, the fixing portion is configured to pass through the mounting hole to fix the blade, a second mounting groove and a third mounting groove are provided on a side of the second frame facing the middle frame, the second mounting groove is configured to accommodate an end of the fixing portion, the third mounting groove is configured to avoid an end of the limiting portion, and the extension portion is pulled to separate the fixing portion from the mounting hole, the sliding assembly comprises a sliding support and a sliding elastic piece, the sliding support passes through the positioning slot and is connected to the drive member, and the sliding elastic piece is connected to the sliding support and abuts between the drive member and the second housing, so that the drive member is movably locked in the positioning slot, a sliding panel is arranged on an end of the sliding support extending out of an outer side of the inner housing to push the sliding assembly to move along the positioning slot, the positioning slot comprises a movement region and a plurality of positioning regions, the movement region is elongated and extends longitudinally along the axial direction and the plurality of positioning regions are distributed at intervals, an engaging portion is arranged on a side of the sliding support facing the drive member and is elongated, the engaging portion is configured to move along the movement region of the positioning slot, a positioning portion is arranged on and protrudes from a side of the drive member facing the positioning slot, and the positioning portion is configured to engage with a positioning region of the plurality of positioning regions to lock the drive member, the drive member comprises a first connecting hole and a second connecting hole, the first connecting hole is configured to be connected to the first guide member on the first frame, the second connecting hole is configured to be connected to the sliding assembly, and when the sliding assembly is pushed, the blade holder is pushed to move by the drive member, the inner housing is provided with an avoidance area, the avoidance area is located at one side or two sides of the first end of the inner housing, the accommodating cavity is in lateral communication with the outside through the avoidance area, and when the blade holder rotates, the avoidance area allows the blade holder to rotate out of or into the accommodating cavity, the safety assembly further comprises a guiding member, the guiding member is fixed to the inner housing, the safety push button comprises a base, a guide groove, a bent portion, and a stop portion, the base is longitudinally movably accommodated in the accommodating cavity, the guide groove is provided on the base to accommodate the safety spring and is configured to engage with the guiding member to cause the base to move longitudinally, the engaging groove and an elongated groove are provided on a side of the base and are spaced apart from each other, the engaging member rotatably presses against the drive member under an action of an engaging spring and is configured to move along the elongated groove or engage with the engaging groove, the bent portion extends in a bent configuration from the base toward the outer side of the inner housing and is exposed to the outer side of the inner housing, a slide groove is formed between the base and the bent portion to be movably connected to the inner housing, the stop portion extends from the base toward the avoidance area to cover at least a part of the avoidance area, and when the blade is located in the longitudinal position, the stop portion is located below the blade to stop the blade from rotating out of the accommodating cavity, and the multi-functional folding knife further comprises a clip, and the clip is elastically arranged on an outer side surface of the outer housing to clip the multi-functional folding knife to an object.

9. The multi-functional folding knife according to claim 4, wherein:

the blade holder comprises a first frame, a middle frame, a second frame, and a frame elastic piece, the middle frame is rotatably connected to the first frame and the second frame, and the frame elastic piece is configured to provide an acting force for pressing the middle frame against the second frame, so that the blade is detachably mounted between the second frame and the middle frame, the first guide member protrudes radially outward from the first frame, and the second guide member protrudes radially outward from the second frame eccentrically with respect to the first guide member, and the middle frame comprises a main body, a shaft portion located on two sides of the main body, and an extension portion located at an end of the main body, the extension portion and the main body are respectively located on two sides of a central axis of the shaft portion, the extension portion is exposed to an outside from an end of the blade holder and is movably located between the first frame and the second frame, and the extension portion is pulled to overcome an elastic force of the frame elastic piece and cause the main body to rotate away from the second frame for replacing the blade.

10. The multi-functional folding knife according to claim 9, further comprising a locking assembly, wherein the locking assembly comprises a locking member and a locking spring, the locking member is elastically and pressably connected to the outer housing, the locking member comprises a locking portion protruding radially, the inner housing is provided with a plurality of locking notches, and the locking portion is detachably engaged with a locking notch of the plurality of locking notches to keep the inner housing in a first state in which the inner housing is exposed from the outer housing or a second state in which the inner housing is disposed within the outer housing.

11. The multi-functional folding knife according to claim 10, wherein:

an elastic piece groove for mounting the frame elastic piece and a first mounting groove for accommodating the middle frame are provided on a side of the first frame facing the second frame, the blade comprises a limiting notch and a mounting hole, the limiting notch and the mounting hole extend through the blade, a limiting portion and a fixing portion are arranged on and protrude from a side of the main body facing the second frame, the limiting portion is configured to engage with the limiting notch, the fixing portion is configured to pass through the mounting hole to fix the blade, a second mounting groove and a third mounting groove are provided on a side of the second frame facing the middle frame, the second mounting groove is configured to accommodate an end of the fixing portion, the third mounting groove is configured to avoid an end of the limiting portion, and the extension portion is pulled to separate the fixing portion from the mounting hole, the sliding assembly comprises a sliding support and a sliding elastic piece, the sliding support passes through the positioning slot and is connected to the drive member, and the sliding elastic piece is connected to the sliding support and abuts between the drive member and the second housing, so that the drive member is movably locked in the positioning slot, a sliding panel is arranged on an end of the sliding support extending out of an outer side of the inner housing to push the sliding assembly to move along the positioning slot, the positioning slot comprises a movement region and a plurality of positioning regions, the movement region is elongated and extends longitudinally along the axial direction and the plurality of positioning regions are distributed at intervals, an engaging portion is arranged on a side of the sliding support facing the drive member and is elongated, the engaging portion is configured to move along the movement region of the positioning slot, a positioning portion is arranged on and protrudes from a side of the drive member facing the positioning slot, and the positioning portion is configured to engage with a positioning region of the plurality of positioning regions to lock the drive member, the drive member comprises a first connecting hole and a second connecting hole, the first connecting hole is configured to be connected to the first guide member on the first frame, the second connecting hole is configured to be connected to the sliding assembly, and when the sliding assembly is pushed, the blade holder is pushed to move by the drive member, the inner housing is provided with an avoidance area, the avoidance area is located at one side or two sides of the first end of the inner housing, the accommodating cavity is in lateral communication with the outside through the avoidance area, and when the blade holder rotates, the avoidance area allows the blade holder to rotate out of or into the accommodating cavity, the safety assembly further comprises a guiding member, the guiding member is fixed to the inner housing, the safety push button comprises a base, a guide groove, a bent portion, and a stop portion, the base is longitudinally movably accommodated in the accommodating cavity, the guide groove is provided on the base to accommodate the safety spring and is configured to engage with the guiding member to cause the base to move longitudinally, the engaging groove and an elongated groove are provided on a side of the base and are spaced apart from each other, the engaging member rotatably presses against the drive member under an action of an engaging spring and is configured to move along the elongated groove or engage with the engaging groove, the bent portion extends in a bent configuration from the base toward the outer side of the inner housing and is exposed to the outer side of the inner housing, a slide groove is formed between the base and the bent portion to be movably connected to the inner housing, the stop portion extends from the base toward the avoidance area to cover at least a part of the avoidance area, and when the blade is located in the longitudinal position, the stop portion is located below the blade to stop the blade from rotating out of the accommodating cavity, and the multi-functional folding knife further comprises a clip, and the clip is elastically arranged on an outer side surface of the outer housing to clip the multi-functional folding knife to an object.

* * * * *